Patented Jan. 3, 1939

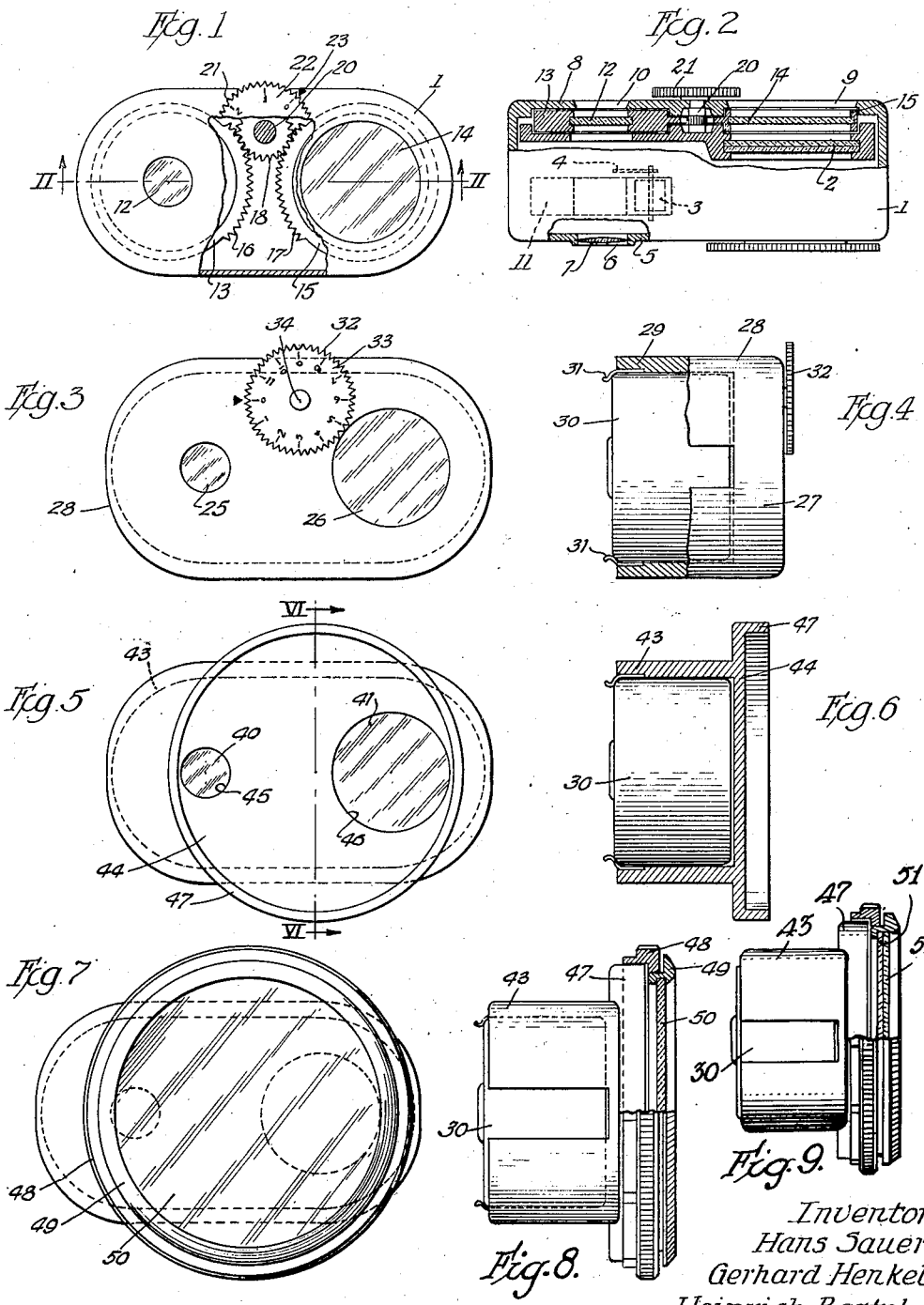

2,142,657

UNITED STATES PATENT OFFICE 2,142,657

EXPOSURE METER

Hans Sauer, Gerhard Henkel, and Heinrich Bartels, Dresden, Germany, assignors to Zeiss Ikon Aktiengesellschaft, Dresden, Germany Application February 17, 1937, Serial No. 126,128
In Germany April 18, 1936

7 Claims. (Cl. 88—23)

The invention relates to improvements in exposure meters for photographic purposes, and particularly pertains to the arrangement of polarizing filters in or on exposure meters.

It is an object of the invention to provide an exposure meter with an adjustable polarizing filter, comprising for instance, foils of dichroic crystal material placed between transparent plates which are cemented together. The application of a polarizing filter to an exposure meter serves the purpose of determining simultaneously with the exposure time the correct position of the polarizing filter, at which disturbing light reflexes, when photographing bright objects, are eliminated. The invention, particularly is adapted for such exposure meters in which an indication of the exposure time appears in the observation opening of the exposure meter. After the polarizer on the exposure meter has been adjusted, the polarizer on the lens of the photographic camera has to be adjusted to the same position as the polarizer on the exposure meter.

Another object of the invention is to provide a photoelectric exposure meter with a polarizing filter which covers not only the observation opening of the exposure meter but covers also the opening through which the photoelectric cell is exposed to light.

It is also an object of the invention to provide a photoelectric exposure meter with two similar polarizing filters, one of which is arranged in front of the observation window and the other one in front of the photoelectric cell, and to provide means for adjusting the two polarizing filters simultaneously and to the same extent.

Another object of the invention is to provide an exposure meter with a detachable polarizing filter, which may be adapted to be transferred to the photographic lens or to the finder lens of a camera.

It is also an object of the invention to provide the polarizing filter with a color filter, which may be permanently or detachably combined with the polarizing filter.

With these and other objects in view the invention includes the following novel features and details of construction and combination of parts, to be hereinafter described and illustrated in the accompanying drawing and pointed out in the appended claims.

In the drawing:

Fig. 1 is a front view of the exposure meter, with a portion of the front wall broken away, Fig. 2 is a bottom view of the same, partly in horizontal section on the line II—II of Fig. 1;

Fig. 3 is a front view of a polarizer, which is adapted to be applied to an exposure meter of conventional construction;

Fig. 4 is a side view of the polarizer when attached to an exposure meter;

Fig. 5 is a front view of an adapter for a single polarizing filter adapted to cover both the viewing opening and the cell exposing opening of a photoelectric exposure meter;

Fig. 6 is a vertical section of the adapter on the line VI—VI of Fig. 5 with the exposure meter in outline;

Fig. 7 is a view similar to Fig. 5 with the polarizing filter attached to the adapter;

Fig. 8 is a side elevation view of the parts shown in Fig. 7, a portion of the parts shown in Fig. 7, a portion of the polarizer mounting being shown in section; and Fig. 9 illustrates a modification of Fig. 8, namely a polarizing filter combined with a color filter.

The Figs. 1 and 2 illustrate by way of example a photoelectric exposure meter comprising an oblong casing 1 which contains the photoelectric cell 2 and the measuring instrument 3. The rear wall 5 of the casing 1 is provided with an observation opening 6, which may be provided with a lens 7. The front wall 8 is provided with an opening 9 for exposing the photoelectric cell 2 to light and with an opening 10 in axial alinement with the observation opening 6. The axis of observation extends clear through the recessed or hollow center portion of the permanent magnet 11 of the measuring instrument 3 and the free end of the pointer 4 appears in the observation area. By looking into the observation opening 6 and directing the opening 10 toward the object to be photographed, the photoelectric cell 2 will be energized by light reflected from said object and the position of the pointer 4 will be an indication of the exposure time for which the camera has to be adjusted.

In accordance with one embodiment of the invention, a polarizing filter 12 is rotatably supported by means of a mounting 13 within the casing 1 directly behind the viewing opening 10 in the front wall 8. A similar polarizing filter 14, however, of larger size, is rotatably supported by its mounting 15 in front of the photoelectric cell 2, between the latter and the front wall 8 and substantially in the same plane as the polarizing filter 12. As particularly shown in Fig. 1, the polarizer mounting 13 and 15 are each provided at their circumference with a series of gear teeth 16 and 17 respectively, meshing with a common pinion 18 fixed on a shaft 20. The shaft 20 extends outside the casing 1 and at its outer end has fixed thereto a manually operable disk-shaped member 21 provided on its outer exposed face with a scale 22 cooperating with a fixed mark 23 on the front wall of the casing 1. Upon rotation of the disk-shaped member 21 both polarizing filters 12 and 14 are rotated simultaneously in the same direction and the scale 22 indicates the position of the filters, so that a corresponding filter, which is arranged in front of the camera lens, may be adjusted to the same relative position in which disturbing reflexes are minimized or eliminated. It will be noted, that as soon as the adjustment of the polarizing filters 12 and 14 has been effected, the exposure time for the respective position of the filter may be determined at once, without removing the exposure meter from the eye. The same observation opening 6 through which the object to be photographed is viewed during the adjustment of the polarizing filters 12 and 14 is used for observing the indication of the measuring instrument 3, for the pointer 4, as mentioned previously, appears in same observation area covered by the polarizing filter 12. Obviously, since the photoelectric cell 2 is covered by a similar filter 14, the cell is energized by light from which the undesirable reflexes have been eliminated.

The Figs. 3 and 4 illustrate a polarizer which forms a separate device and is adapted to be attached and detached to and from a conventional exposure meter. The polarizing filters 25 and 26, which come to lie in front of the viewing opening and the photoelectric cell respectively, are mounted rotatably in the front portion 27 of a casing-like member 28 which is provided with a rearwardly extending oblong slotted wall 29 adapted to receive the casing 30 of the exposure meter. Springs 31 may be provided to retain the exposure meter within said casing-like member 28. As in the first embodiment, a manually rotatable disk-shaped member 32 with a scale 33 is mounted on the outside of the front portion 27 on a shaft 34 and is adapted to rotate the two polarizing filters 25 and 26 simultaneously, uniformly and in the same direction.

Another embodiment of a detachable polarizer is illustrated by the Figs. 5 to 8. Instead of two polarizing filters only one is used, which is sufficiently large to cover simultaneously the viewing opening 40 and the photoelectric cell 41 of the exposure meter 30.

The Figs. 5 and 6 illustrate the adapter of the polarizer, which consists of a slotted oblong wall 43 adapted to surround the oblong casing of exposure meter 30, a front wall 44 provided with two apertures 45 and 46 in alinement with the viewing opening 40 and the photoelectric cell 41 respectively of the exposure meter, and an annular flange 47 for frictionally engaging the mounting 48 (Fig. 8) of the polarizing filter 50.

According to Fig. 8 the filter 50 is fixedly secured in a mounting ring 49 which is rotatably adjustable, for instance by means of a thread, in the mounting 48. After the filter 50 has been rotatably adjusted, it may be removed with its mounting 48 from the flange 47 of the adapter and may be transferred in the same relative position to a photographic lens or a finder lens, as desired. A scale, for instance on the adapter, may be provided, to permit a ready determination of the position of the filter, so that a corresponding filter on the photographic lens may be adjusted to the same position, or the filter be transferred in the same position to the lens.

If desired, the polarizing filter of the invention may be combined with a color filter, to obtain for instance a certain reproduction of the light values of colors. For such a purpose, the casing of the exposure meter or the mountings of the filters are constructed in such a way, that a color filter may be conveniently associated with the polarizing filter. Fig. 9 shows by way of example a polarizing filter 51 combined with a color filter 52 in the adjustable mounting ring of the adapter.

What we claim is:

1. In a photoelectric exposure meter, the combination of a casing provided with two spaced openings in one wall, a photoelectric cell in alinement with one of said openings, an electric measuring instrument associated with the photoelectric cell, the rear wall of the casing having a viewing opening in alinement with the other opening in said first mentioned wall, and polarizing means conjointly rotatably adjustable in front of the photoelectric cell opening and the other opening in said first mentioned wall, and means associated with said casing for rotatably supporting said polarizing means in front of said two spaced openings.

2. In an electric exposure meter, the combination of a casing, a photoelectric cell, a measuring instrument, the casing having two spaced openings in its front wall, the photoelectric cell being in alinement with one of said openings, the rear wall of the casing having a viewing opening in alinement with the other opening in said front wall, polarizing means conjointly rotatably adjustable in front of the opening for the photoelectric cell and the other opening, means associated with said casing for rotatably supporting said polarizing means, and means indicating the adjustment of said polarizing means.

3. In an exposure meter, the combination of a casing having a front wall with two spaced openings, a photocell in the interior of the casing in alinement with one of said openings, the rear wall of the casing being provided with a viewing opening in alinement with the other opening in the said front wall, separate polarizing means in front of the opening of the photoelectric cell and the viewing opening respectively, means associated with said casing for rotatably supporting said separate polarizing means, and means for conjointly rotatably adjusting both of said polarizing means in front of said openings.

4. In an exposure meter, the combination of a casing having two spaced openings in its front wall, a photoelectric cell in the interior of the casing alined with one of said openings, the rear wall of the casing having a viewing opening alined with the other opening in the said front wall, polarizing means in front of both of said front wall openings, means associated with said casing for rotatably supporting said polarizing means, and means for rotatably and simultaneously adjusting the polarizing means in front of both of said openings over the same circular extent.

5. In an exposure meter, the combination of a casing having two spaced openings in its front wall, a photocell in alinement with one of said openings, the rear wall of the casing having a viewing opening in alinement with the other front wall opening, a single polarizing element in front of both of said front wall openings, means associated with said casing and readily detachably attached thereto for rotatably supporting said polarizing element in front of said two openings, and means for rotatably adjusting said single polarizing element to the same extent relatively to both of said front wall openings.

6. In an exposure meter, the combination of a casing having two spaced openings in its front wall, a photoelectric cell in alinement with one of said openings within the casing, the rear wall of the casing having a viewing opening in alinement with the other opening of the front wall, a polarizing means for both of said front wall openings, a single detachable carrier for said polarizing means attachable to said casing, and means on said detachable carrier for rotatably adjusting said polarizing means relatively to both of said openings simultaneously the same angular distance.

7. In an exposure meter, the combination of a casing having two spaced openings in its front wall, a photocell in the casing in alinement with one of said openings, the rear wall of the casing having a viewing opening in alinement with the other front wall opening, a single disc of polarizing material of a size sufficient to overlap both of said front wall openings, and a carrier detachable from said casing in which said polarizing disc is rotatably supported.

HANS SAUER.
GERHARD HENKEL.
HEINRICH BARTELS.